United States Patent [19]

Berger

[11] Patent Number: 4,594,162

[45] Date of Patent: Jun. 10, 1986

[54] PLEATED FILTER AND METHOD AND APPARATUS FOR FABRICATING SAME

[75] Inventor: Richard M. Berger, Richmond, Va.

[73] Assignee: American Filtrona Corporation, Richmond, Va.

[21] Appl. No.: 579,761

[22] Filed: Feb. 13, 1984

[51] Int. Cl.⁴ ............................................. B01D 27/06
[52] U.S. Cl. .................................. 210/493.1; 55/487;
55/498; 55/521; 55/DIG. 5; 156/205; 156/210;
156/474; 210/493.3; 210/493.5; 210/506;
264/287; 264/507; 425/369; 493/43; 493/44
[58] Field of Search ...................... 493/43, 44, 46, 47,
493/48; 210/483, 493.1, 493.3, 493.5, 506, 508,
509; 55/487, 497, 498, 521, DIG. 5; 156/205,
210, 474; 264/505, 506, 507, 286, 287; 425/369,
391, 396

[56] References Cited

U.S. PATENT DOCUMENTS

| | | | |
|---|---|---|---|
| 2,954,036 | 9/1960 | Schur et al. | 493/42 X |
| 3,313,665 | 4/1967 | Berger | 131/84 B |
| 3,377,220 | 4/1968 | Berger et al. | 264/518 |
| 3,552,400 | 1/1971 | Berger et al. | 131/339 |
| 3,774,508 | 11/1973 | Berger et al. | 493/47 |
| 3,867,294 | 2/1975 | Pall et al. | 210/493.5 X |
| 4,099,943 | 7/1978 | Fischman et al. | 55/487 |
| 4,390,031 | 6/1983 | Berger | 131/336 |
| 4,422,939 | 12/1983 | Sharp et al. | 210/493.3 |

FOREIGN PATENT DOCUMENTS

| | | | |
|---|---|---|---|
| 2726670 | 1/1979 | Fed. Rep. of Germany | 55/498 |
| 452547 | 8/1936 | United Kingdom | 210/493.1 |

Primary Examiner—Richard V. Fisher
Assistant Examiner—W. Gary Jones
Attorney, Agent, or Firm—Holman & Stern

[57] ABSTRACT

A filter for separating constituent components of fluids includes a plural-layer sheet-like member which is multiply pleated to provide layers of the same or different porosity or to provide structural support layers for pleating a soft or membrane-like filter layer. The multiple layers may be pre-joined or delivered from individual locations to a pneumatic conveyor passage of predetermined cross-section through which the adjacent layers are conveyed by a conveyor gas. The layers are crimped to form pleats by withdrawing the material at a lower linear speed than that at which it is supplied to the passage. Pleating is facilitated by venting the conveyor gas at a passage section of enlarged cross-section. The pleating material is subjected to a hot gas, such as steam, and then cooled by a cooling gas to effect bonding of the layers in the pleated state.

44 Claims, 8 Drawing Figures

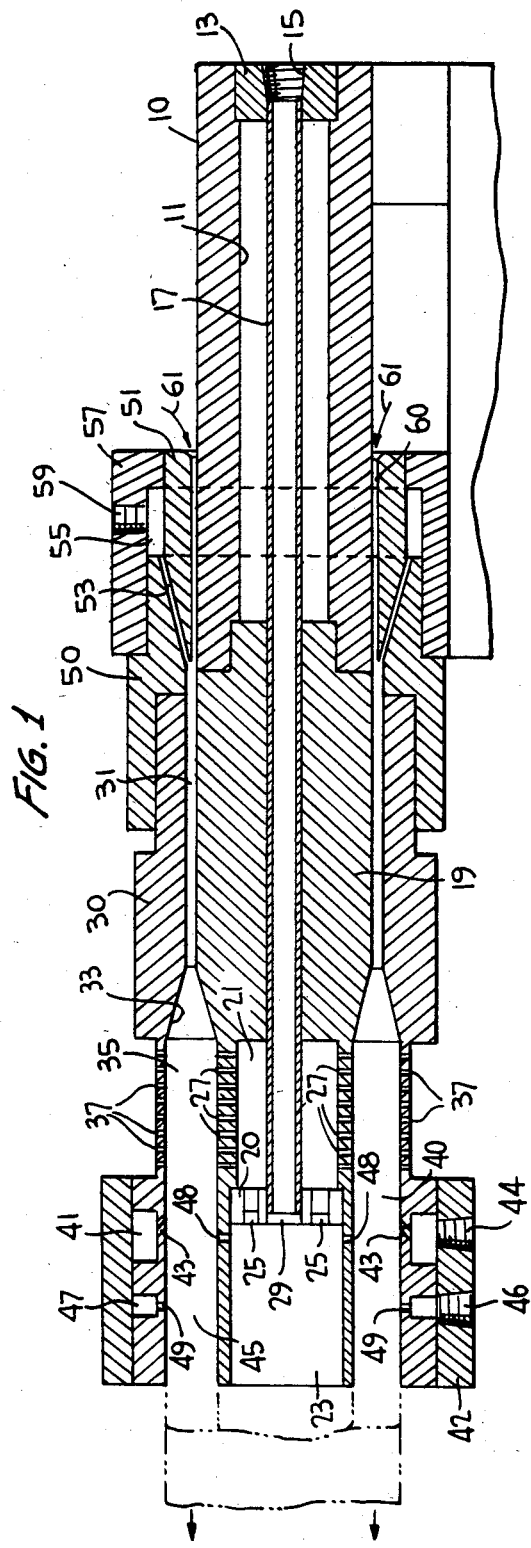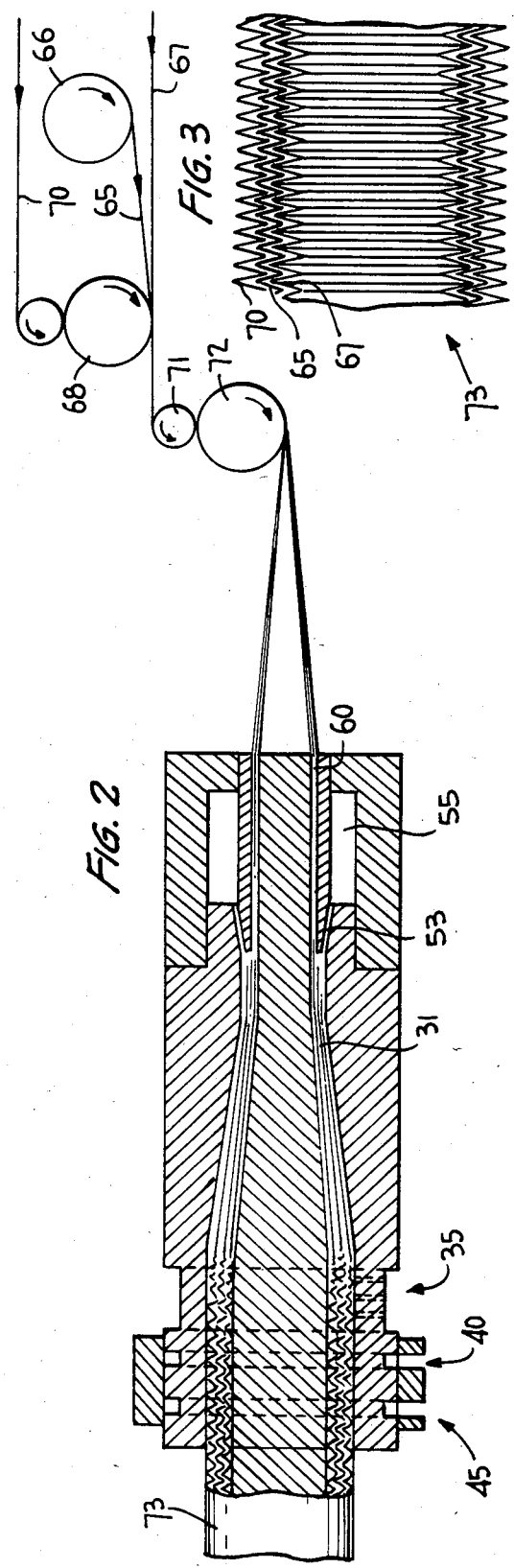

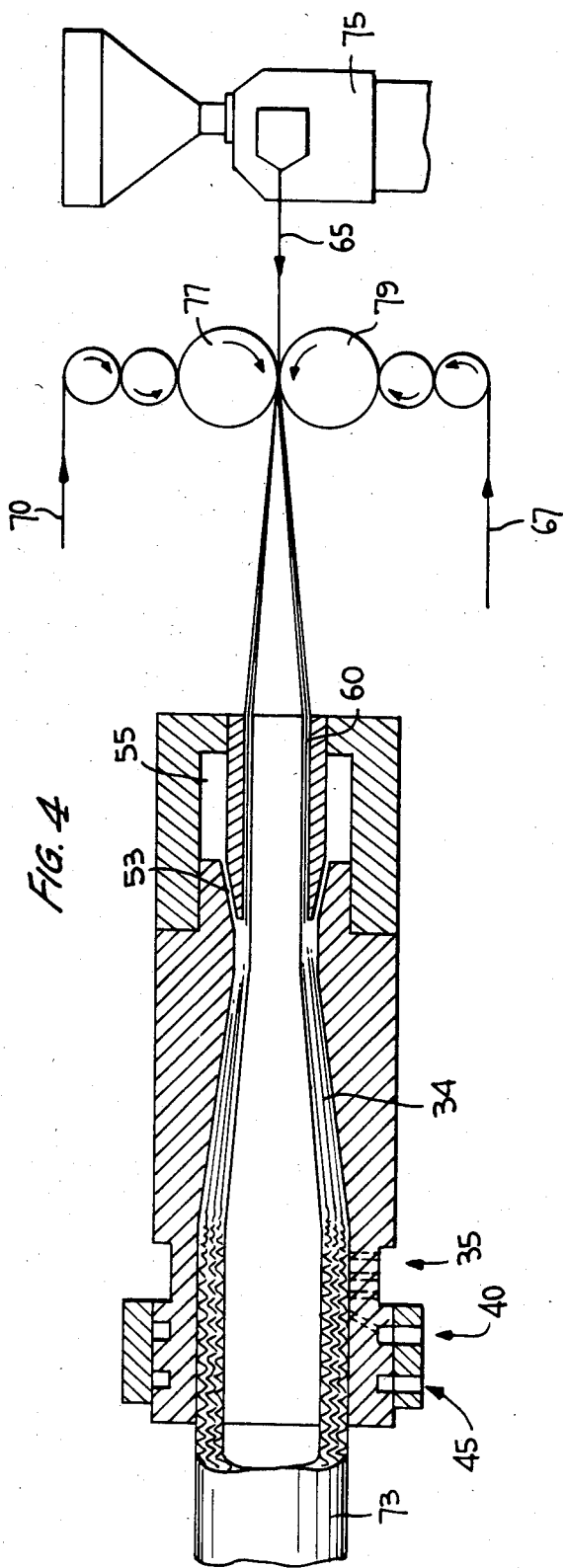

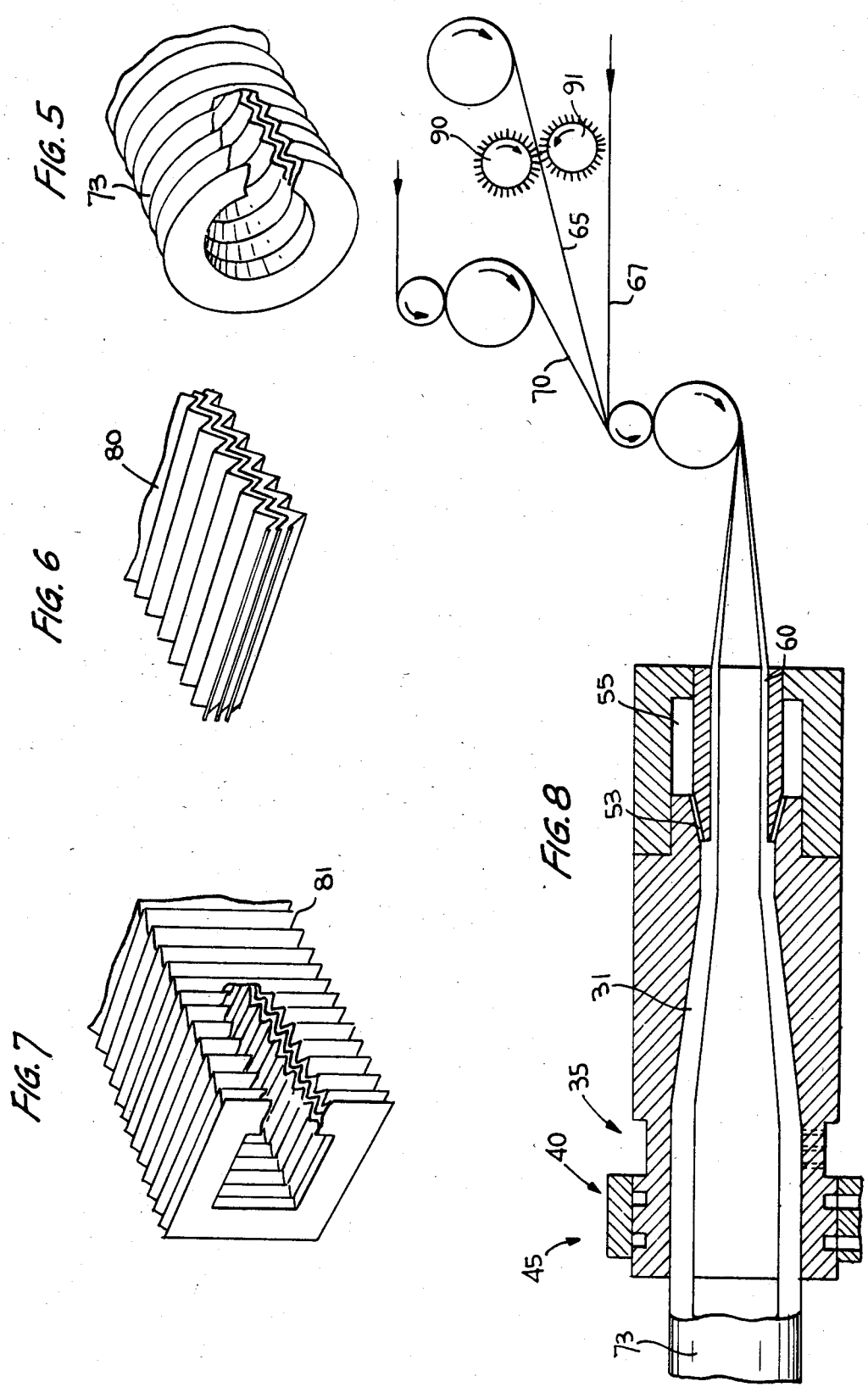

PLEATED FILTER AND METHOD AND APPARATUS FOR FABRICATING SAME

BACKGROUND OF THE INVENTION

1. Technical Field

The present invention relates to the filtering of fluids and, more particularly, to an improved pleated filter as well as a method and apparatus for fabricating such filter.

The invention relates generally to the subject matter disclosed in U.S. Pat. Nos. 3,313,665, 3,377,220, 3,552,400 and 4,390,031. The subject matter disclosed in each of these patents is expressly incorporated herein, in its entirety, by reference.

2. Discussion of the Prior Art

It has long been recognized that pleated filters provide increased filter surface area as compared with filters having no pleats and the same exterior dimensions. However, there are a number of practical disadvantages inherent in prior art pleated filters which have severely limited the practical commercial use of such filters. For examle, the filter material which is to be pleated must be sufficiently structurally self-supporting so as to retain its shape when pleated. Thus, when thin membrane-like sheets of material are called for to perform the necessary filtering function, the structural integrity of the filter in pleated form requires the use of much thicker material. This occupies far more space than would be required for the thinner sheet of filter material, and also restricts the number of pleats permitted per linear inch of filter employed. Prior art attempts to provide a large number of pleats per inch have resulted in a closing off of the pleats, thereby restricting the available filter surface area. In addition, it has been impossible, heretofore, to provide a unitized depth filter in pleated form.

OBJECT AND SUMMARY OF THE INVENTION

It is therefore an object of the present invention to provide a pleated filter structure which permits a larger number of pleats to be provided per given filter length without sacrificing filtering efficiency. It is similarly an object of the present invention to provide an apparatus and method for fabricating such a filter structure.

It is another object of the present invention to provide a pleated filter structure wherein filter material in the form of soft sheets and membranes may be pleated and still function without a loss of filtering efficiency. It is another object of the present invention to provide a method and apparatus for fabricating such a filter.

It is another object of the present invention to provide a filter structure, and a method and apparatus for fabricating such a filter structure, which provides complicated high efficiency filtering at a low cost.

A further object of the present invention is to provide a multi-stage filter in a unitized structure which, by virtue of pleating, offers a large filter surface area and in which the various stages may be of the same or different porosity. It is likewise an object of the present invention to provide a method and apparatus for fabricating such a filter.

In accordance with the present invention, a pleated filter is fabricated from a sheet having two or more adjacent layers. The individual layers may be the same material or materials of different porosity. If one layer is made of material which is too thin to support a pleated configuration on its own, one or more additional layers are selected to provide the necessary structural support. In the preferred embodiment described herein, a layer of filter material is inserted between two layers or bands of tow material. The resulting plural layer sheet is conveyed through a pneumatic conveyor having a passage with a transverse cross-section corresponding to the desired outer configuration of the resulting filter. The sheet is conveyed through the passage by means of a conveyor gas which is vented at a venting location in which the passage is enlarged in cross-section. The sheet is withdrawn from the passage at a lower linear speed than the speed at which the materials are delivered to the passage so that the sheet is caused to be crimped into adjacent plates, particularly at the enlarged venting location. Since the filter layer is caught between the tow layers, it is pleated along with the tow layers. The tow keeps the filter sheet pleats from closing off on one another while themselves presenting filtration media on both sides of the pleated sheet. The resulting structure is a laminated pleated filter having three stages of filtration.

The resulting filter structure increases filtration capability without increasing pressure drop and offers a unitized three stage filter structure. The latter property is useful for coalescing water from fuel. In addition, the filter of the present invention permits soft or membrane-like sheets of filter material to be pleated and retain their structural integrity. Further, complicated high efficiency filters may be fabricated at a relatively low cost.

BRIEF DESCRIPTION OF THE DRAWINGS

These and other objects, features and many of the attendant advantages of the present invention will be better understood from the following detailed description when considered in connection with the accompanying drawings wherein like parts in each of the several figures are identified by the same reference numerals, and wherein:

FIG. 1 is a view in longitudinal section of apparatus according to the present invention for fabricating a filter of the present invention;

FIG. 2 is a partially diagrammatic view in longitudinal section of another apparatus according to the present invention and illustrating one method of the present invention for fabricating a filter;

FIG. 3 is an enlarged detailed view in longitudinal section of a filter fabricated in accordance with the method and apparatus illustrated in FIG. 2;

FIG. 4 is a partially diagrammatic view in longitudinal section of the pleat-forming apparatus of FIG. 2 employed with different material delivery apparatus in accordance with another method of the present invention;

FIGS. 5, 6 and 7 are respective views in prospective of different external shapes of pleated filters which can be fabricated in accordance with the method and apparatus of the present invention; and FIG. 8 is a view in longitudinal section of the pleat-forming apparatus of FIG. 2 employed in conjunction with a different material delivery system in which a filter sheet is pre-crimped in accordance with still another aspect of the present invention.

DESCRIPTION OF THE PREFERRED EMBODIMENTS

Referring specifically to FIG. 1 of the accompanying drawings, a filter pleating apparatus according to the present invention includes an elongated hollow member 10 having a longitudinally extending central bore 11. The bore 11 is closed at one end by means of a plug member 13 through which a longitudinally-extending bore 15 is defined. Bore 15 has a fitting disposed at one end thereof and receives an elongated tube 17 at its other end. Tube 17 extends through bore 11 beyond the opposite end of tubular member 10. That opposite end of tubular member 10 engages a generally cylindrical member 19 having a longitudinally-extending bore in which tube 17 is supported. The end of member 19 remote from tubular member 10 is hollow and is provided with a generally cylindrical insert 20 which subdivides the hollow interior of member 19 into a venting chamber 21 and an end chamber 23. Insert 20 is provided with a recess which receives and supports the distal end of tube 17, and is also provided with a plurality of flow passages 25 which provide flow communication between the venting chamber 21 and the end chamber 23. The exterior of member 19 tapers so that the outside diameter of member 19 is reduced, as compared to the outside diameter of tubular member 10, in the region surrounding the vent chamber 21 and end chamber 23. A plurality of radially-extending passages 27 are defined through member 19 in venting region 21 so that the environment immediately surrounding the member 19 at venting region 21 communicates with the venting region and, via passages 25, with the end region 23 which opens to atmospheric pressure. In addition, tube 17 provides flow communication from bore 15 in member 13 to the open end chamber 23 via the bore 29 in insert 20.

A hollow outer member 30 is disposed concentrically about member 19 and is radially spaced therefrom to define an elongated annular passage 31. The inner diameter of member 30 increases in a region 33 opposite the decreasing outer diameter of member 19 so that passage 31 diverges in this region before entering a venting station 35 which is co-extensive with venting chamber 21. A plurality of vent passages 37 extend radially outward through the wall of member 30 at venting station 35 so that the venting station includes vent passages 27 extending radially inward and vent passages 37 extending radially outward therefrom.

Downstream of vent station 31, there is disposed a heating station 40 demarked by a circumferential recess 41 defined in the outer wall of member 30. A plurality of passages 43 extend from recess 41 generally inwardly and upstream into the heating station 40. Passages 43 are angularly spaced about the periphery of the heating station in recess 41.

Just downstream of heating station 40 is a cooling station 45 demarked by a circumferential recess 47 defined in the outer wall of member 30. A plurality of passages 49 extend inwardly into cooling station 45 from recess 47 in a generally radial direction. An outer sleeve member 42 is disposed concentrically about the downstream end of member 30, co-extensive with heating station 40 and cooling station 45. A fitting 44 is defined through sleeve member 42 so as to communicate with recess 41 at heating station 40 so that steam or other suitable hot gases may be supplied to recess 41. Another fitting 46 is defined in sleeve member 42 and communicates with recess 47 so that air or other cooling gas may be supplied to that recess proximate the cooling station 45.

The upstream end of member 30 is surrounded by an intermediate sleeve member 50 having a generally frusto-conical inner surface which surrounds the downstream end of elongated hollow member 10. A nozzle forming member 51 also surrounds the downstream portion of member 10 and has an outwardly facing frusto-conical surface which is co-extensive with and radially spaced from the inner frusto-conical surface of member 50. The spacing between these two surfaces defines a generally frusto-conical nozzle 53 having a downstream end which terminates at the upstream end of annular passage 31. The upstream end of nozzle 53 terminates in an annular supply channel 55 which is defined between nozzle-forming member 51 and a surrounding sleeve 57. A suitable fitting 59 is defined through sleeve 57 to permit air under pressure, or other suitable conveyor gas, to be injected into passages 31 through supply channel 55 and nozzle 53. Nozzle-forming member 51 is also radially spaced from the exterior of member 10 so as to define an annular passage 60 which extends in a longitudinal direction to terminate at the upstream end of annular passage 31. The upstream end of annular passage 60 is open to receive material, as indicated by arrows 61, which forms the pleated filter of the present invention.

In the manner described below, a sheet of filtering material may be fed with tow material into annular passage 60 along the path designated by arrows 61. Continuous filamentary tows of various materials, including cellulose acetate, viscose, nylon, etc. have heretofore been developed and commonly employed in fabricating filters. For example, cellulose acetate tows have been employed for making cigarette filters, and the like. Generally, the fibers of the two are formed with spinneret devices, and the strands exiting from such spinneret devices are bunched together to form a "raw tow" which is wound, or folded, into a bale for subsequent processing. The subsequent processing operations usually involve, in addition to unwinding of the raw tow, spreading apart of the fibers of the tow to provide a relatively thin fiber layer, tensioning the fibers to eliminate the crimps therein, impregnating the fiber layer with a plasticizer which can bond adjacent fibers together, and gathering the bonded layer through a suitable funnel, or the like, to form a treated cylindrical tow having filaments therein which are primarily oriented in a longitudinal direction.

The above specific discussion of prior tow treating techniques is incorporated herein merely to explain the type of two which can be used in accordance with the preferred embodiment of the present invention. It is to be clearly understood, however, that the invention is not specifically limited to formation of products from tows, much less previously available tows, nor are filaments formed from spinnerets necessarily as prerequisite starting material for the invention. Instead, various fibrous materials, filaments, and the like can be used as base materials and the starting form thereof can be widely varied. At the same time, the use of filaments, and a two containing the same, facilitates certain method steps hereof and, since tows of spun filaments are readily available or can be easily formed at comparatively low cost, a filamentary tow provides a desirable base or starting element for use in accordance with the present invention. In any case, the material to be treated, including at least two layers of material disposed adjacent one another in the manner described below, is delivered to annular nozzle 61. The walls of nozzle 61 and passage 31 may be coated with polytetrafluoroethylene (Teflon) or other such material, if desired, to provide reduced friction therein. The delivered material is conveyed through passage 31 pneumatically by means of a conveying gas delivered under pressure to fitting 59. The conveying gas is passed through supply channel 55 to nozzle 53 which directs the conveying gas into annular passage 31. The angle made by the frusto-conical nozzle 53 with the longitudinal axis of the unit falls within the range of approximately 0° to 25°, and preferably is about 15°. The conveying gas, which may be air, for example, is at a sufficiently high pressure to pneumatically convey the tow through annular passage 31 in a formation substantially conforming to the annular cross-section of that passage. However, the pressure of the gas deliverd to convey the material must be sufficiently low so that all, or substantially all, of the conveying gas can be vented through vent passages 27, 37 in venting region 35. The conveyor gas transports the material in the form of sheet laminations into the venting station where the release or venting of the conveyor bends the laminated sheet combination back and forth between member 19 and member 30. In other words, the annular jet of conveyor gas creates a suction effect at the upstream end of annular passage 31 which draws the material through annular passage 60 at a velocity proportional to the velocity of the conveyor gas through channel 31. Further transport of the material, after the conveyor gas has been exhausted from venting region 35, is effected from externally of the illustrated apparatus (for example, by means of a pulling device such as the type illustrated and described in the aforementioned U.S. Pat. No. 4,390,031). After passing the venting station 35, the crimped or pleated material is subjected to heating by means of a heated gas injected through fitting 44, recess 41 and passages 43 into direct contact with the radially-outer portion of the material. In addition, hot gas delivered at the fitting in bore 15 of member 13 passes through tube 17 into end region 23 wherefrom it is caused to flow through passages 48 into direct contact with the radially-inner side of the material at heating station 40. The heating gas is preferably steam under pressure, the major portion of which condenses on contact with the material to provide the heat necessary to render the tow boundable at points of contact of the individual filaments of the tow in well-known manner.

After the material has been heated at heating station 40, it is passed through cooling station 45 at which point coolant gas, such as air, is introduced to bond the tow into a self-sustaining, dimensionally stable filter having the ultimate predetermined cross-sectional size and shape of the annular passage at stations 40 and 45. The coolant air is delivered from fitting 46 to recess 47 and from there into contact with the material through passages 49.

After passing through the cooling station 45, the material has been formed into a self-sustaning, dimensionally stable, pleated filter filter in which the pleats have fold lines extending transversely to the direction of travel through the apparatus illustrated in FIG. 1. The filter is withdrawn from the apparatus at an average linear speed which is lower than the linear speed of the incoming material fed into annular passage 60. When the filter is withdrawn at an average liner speed which is less than the incoming linear speed, the material is reoriented within the confined passage into adjacent and overlapping relation in generally successive pleats which extend transversely of the direction of travel. This reorientation initially occurs prior to contacting of the tow with the heated gas. regardless of the relative rate of withdrawal of the resultant filter structure, due to the pneumatic feeding technique, at least a major portion of the crimp initially present in the material is retained by the material upon exiting from the apparatus. Moreover, secondary crimp is imparted to the material by the preferred processing techniques of the present invention and is retained by the material in the resulting filter structure. The relationship between the average linear speed of the incoming material to the average linear speed of the withdrawn filter structure can vary over a considerably wide range. For most applications, this ratio will vary from between 10:1 to 100:1 in order to provide desirable filter products according to the present invention. The withdrawing rate of the filter structure may be readily controlled by selective operation of the pulling means noted above.

A generally similar type of pleating apparatus is illustrated on the left hand side of FIG. 2 to which specific reference is now made. The material delivered to the apparatus includes a bottom tow band 67, a top tow band 70, and a sheet of filter material 65. The sheet of filter material is delivered from a roller 66 on which it is stored and is sandwiched between the upper tow band 70 and bottom tow band 67 at roller 68. The composite sheet member, comprising the three layers 65, 67 and 70, is delivered by means of rollers 71 and 72 to the annular inlet passage 60 of the pleating apparatus. The laminated sheet of material is conveyed through passage 31 by means of the conveyor gas delivered from nozzle 53 and vented at venting station 35. The material is caused to crimp or pleat at venting station 35 in the manner described above and is then passed through the heating zone or station 40 and cooling zone or station 45 before exiting the pleating apparatus.

The filter structure which is delivered by the pleating apparatus in FIG. 2 is generally desingated by the reference numeral 73 and is illustrated in greater detail in FIG. 3. Specifically, the filter structure 73 is a sheet-like member formed into a hollow cylindrical structure having three adjacent layers 65, 67 and 70. A multiplicity of successively adjacent pleats each includes the three layers 65, 67 and 70 and the pleats are provided with fold lines extending transversely of the longitudinal dimension of the cylindrical structure 73. Thus, if the filter material in sheet 65 is membrane-like or otherwise too soft to structurally sustain a pleated configuration, the tow or other strengthening materials 67, 70 provide the necessary structural support for the pleats. Since the filter material 65 is trapped between the two strands of tow 67, 70, the tow material keeps the pleats in the filter sheet 65 from closing off one another. In addition, since the tow material itself serves as a filtration medium, a three-stage filter structure is provided through the thickness of the resulting filer structure 73. The two tow materials may be the same or different, and the three materials 65, 70 and 75 may have the same porosity or different porosities.

Referring specifically to FIG. 4 of the accompanying drawings, the apparatus illustrated therein is basically similar to that illustrated in FIG. 3 with the exception of the manner of delivery of the three layers of material to the pleating apparatus. Specifically, the filter layer 65, in the embodiment of FIG. 4, is derived from an extruder 75 and delivered into sandwiched relation between the top tow band 70 and the bottom tow band 67 between respective rollers 77 and 79. In all other aspects, the embodiment illustrated in FIG. 4 is the same as that described above in relation to FIGS. 1 and 2.

The generally hollow filter structure 73 is illustrated in perspective in FIG. 5 and derives its hollow cylindrical configuration from the cross-sectional configuration of the annular passage in the pleating apparatus. It is to be understood, however, that this transverse cross-section of the passage in the pleating apparatus may be varied so as to provide a solid three-layered sheet 80, such as illustrated in FIG. 6, or the hollow rectangular or square structure 81 illustrated in FIG. 7. In other words, in order to produce the filter construction 80 illustrated in FIG. 6, the passage through the pleating apparatus has a generally rectangular cross-section which is elongated in one dimension transversely of the flow direction through the apparatus. In order to provide the hollow rectangular construction 81 of FIG. 7, the cross-section of the passage 31 and its enlarged downstream counterparts is a rectangular annulus, as opposed to the circular annulus which provides the hollow cylindrical structure 73 illustrated in FIG. 5.

Still another embodiment of the present invention is illustrated in FIG. 8. In that embodiment, the pleating apparatus is essentially the same as that illustated in FIGS. 2 and 4. The major difference in the embodiment of FIG. 8 concerns the fact that the filter layer 65 is partially pre-crimped between crimping rollers 90 and 91 before the filter layer 65 is sandwiched between the top and bottom tow bands 70 and 67, respectively. This pre-crimping of the filter layer 65 facilitates the pleating process in the pleating apparatus.

It is also possible to practice the present invention by utilizing two filter layers instead of three, the two layers being folded together to form the requisite pleats. Likewise, more than three layers may be employed, although the thickness of the pleats under such circumstances may be too great to permit a meaningfully large number of pleats to be disposed within a given length of the filter structure. Of course, it is desirable to maximize the number of pleats per given length of filter structure so as to maximize the presented filter surface area per length of filter structure.

The method and apparatus for producing the filter in accordance with the present invention is a variation of the method and apparatus described in the aforementioned U.S. Pat. No. 4,390,031. That method and apparatus, in turn, is a variation of the method and apparatus described in the aforementioned U.S. Pat. No. 3,313,665. In the process disclosed in the latter patent, the density of the resulting product is determined by the ratio of the linear speed of the exiting material to the linear speed of the incoming material. In the case of a laminated sheet member material, as used with the present invention, one may calcute the number of pleats per inch by determining the wall thickness and the ratio of the velocities of the incoming material and the exiting material. In other words, exiting material having a one inch wall thickness in a pleating apparatus with a speed ratio of 100:1 produces a resulting structure with fifty pleats to the inch. The total surface area of the resulting filter structure is the length of a pleat times twice the width of the sheet. Thus, with an output filter structure having a circumference of ten inches and a wall thickness of one inch, employed in a pleating apparatus with a speed ratio of 100:1, a filter surface area of 500 square inches per linear inch would be the result. This permits a surface area increased by pleating which far exceeds any such increase that has been produced in the prior art. With this high surface area, the filter sheet 65 can be made very dense, and fine fibers, in the range of 1 micron can be employed while still maintaining a useful porosity.

The description set forth above relates to feeding a filter sheet between two strands of tow, or alternatively, adjacent one strand of tow. however, the resulting sheet material may be formed using a melt blown process. Under such circumstances, fine fibers are extruded between the tow to form the filter sheet. One advantage of the melt blown process is that the sheet of filter material is attached to the tow prior to entry into the pleating apparatus and filled in between the strands of fiber making up the tow, thereby increasing the surface area beyond that which would be achieved with the straight sheet approach. In addition, it has been demonstrated that the melt blown fibers can be made much finer than is possible with conventional fiber-making techniques. The fibers adhere to the tow in the same manner that hot melt adheres because the fibers are above the melt temperature.

The method described above for fabricating a filter structure results in tubes which are flexible and which can be formed about a mandrill to make a spiral filer configuration. The spiral configuration increases the surface area by a factor of pi, so that any advantages achieved with the present technique can be further increased by a little over three times utilizing the spiral approach.

I have fabricated numerous types of filter structures using the pleating apparatus and method disclosed for the present invention. One structure I have fabricated employs nylon as the two outer tow layers surrounding a sheet of Delnet. Another structure employed nylon with Reemay, the latter being used in two different filter constructions wherein a two layer structure and a three layer structure were fabricated.

From the foregoing description, it will be appreciated that the invention makes available a novel multi-stage filter wherein each stage is made up of a different layer of material. The filtration is increased without increasing the pressure drop and a unitized structure is provided for the multi-stage combination. The unitized three-stage filtration stucture is particularly valuable for coalescing water from fuel. In addition, the filter structure in accordance with the present invention permits sheets of soft filter material, such as membranes, to be utilized in a pleated filter structure in spite of the fact that the sheet, of itself, is not structurally capable of supporting a pleated construction. Finally, the apparatus and method for making such filter structures is simple and inexpensive and permits highly efficient filters to be fabricated.

Having described several embodiments of a new and improved filter structure and method and apparatus for fabricating same, it is believed that other modifications, variations and changes will be suggested to those skilled in the art in view of the disclosure set forth herein. It is therefore to be understood that all such variations, modifications and changes are believed to fall within the scope of the invention as defined by the appended claims.

What is claimed is:

1. A filter for physically separating constituent components of a fluid, said filter comprising: a sheet-like member having a plurality of adjacent layers, each layer being porous to at least one constituent component of said fluid, at least one of said layers being generally impervious to a second constituent component of said fluid, said sheet-like member being in the form of a hollow peripherally integral and continuous tube having a longitudinal tube axis and a multiplicity of successively adjacent pleats having fold edges oriented generally transversely of said longitudinal tube axis;

said sheet-like member being a substantially solid, dimensionally stable body;

said at least one of said layers which is generally impervious to said second constituent having a thickness; each of said pleats having a length; each pair of adjacent pleats being separated by a distance by material from ones of said layers which are adjacent to said at least one of said layers which is generally impervious to said second constituent;

a ratio of said length to said distance being at least 10:1.

2. The filter according to claim 1 wherein said plurality of adjacent layers comprises two outer layers and an inner layer disposed between said two outer layers, wherein said inner layer corresponds to said at least one of said layers and is impervious to said second component of said fluid.

3. The filter according to claim 2 wherein said two outer layers each comprise a respective continuous filamentary tow of substantially continuous thermoplastic fibers.

4. The filter according to claim 2 wherein said tube has a longitudinally-extending cylindrical configuration with an annular transverse cross-section.

5. The filter according to claim 2 wherein said tube has a longitudinally-extending configuration with a polygonal transverse cross-section.

6. The filter according to claim 2 wherein said inner layer and said outer layers are respective sheets of the same material.

7. The filter according to claim 2 wherein said outer layers are a nylon and said inner layer is a different material having a lower porosity than said nylon.

8. The filter according to claim 1 wherein each of said layers has a different porosity.

9. The filter according to claim 1 wherein said tube has a longitudinally-extending cylindrical configuration with an annular transverse cross-section.

10. The filter according to claim 1 wherein said tube has a longitudinally-extending configuration with a polygonal transverse cross-section.

11. A filter as claimed in claim 1, wherein said ratio is at least 100:1.

12. A filter as claimed in claim 1, wherein said tube has a wall thickness of approximately one inch, a circumference of approximately 10 inches, and said ratio is approximately 100;

said tube having a filter surface area of approximately 500 square inches per linear inch.

13. A method for fabricating a filter for separating constituent components from a fluid, said method comprising the steps of:

forming a plural-layer sheet-like member, having a plurality of layers of material adjacent one another, into an elongated and peripherally continuous tube;

folding said tube to provide multiple sequentially adjacent plural-layer peripheral pleats having fold lines disposed generally transversely of the length of said tube;

the step of forming including the steps of:

feeding said plurality of layers from respective individual locations in adjacent relation into an entrance to a longitudinally-extending, transversely-configured passage of predetermined transverse cross-section; and conveying the adjacent layers longitudinally through said passage in side by side relation;

the step of conveying including pneumatically conveying said layers by flowing a conveying gas into said passage at a conveyor location with a flow component directed longitudinally of said passage.

14. The method according to claim 13 wherein the step of flowing includes flowing said conveying gas into said passage from a plurality of angularly spaced apertures disposed about the transverse periphery of the passage at said conveyor location.

15. The method according to claim 14, wherein the step of flowing includes delivering the conveying gas into said passage at an angle in the range of 0° to 20° relative to longitudinal.

16. The method according to claim 13 wherein the step of folding includes the step of withdrawing the sheet-like member from an exit of said passage at an average linear speed which is lower than the linear speed at which said layers are fed to said entrance so as to cause said sheet-like member to be multiply crimped in said passage.

17. The method according to claim 16 wherein the step of folding further includes the step of:

venting said conveying gas from said passage at a passage venting location having a widened transversed cross-section and which is longitudinally downstream of the conveyor location.

18. The method according to claim 17 further including the step of:

introducing a heated gas into said passage and into direct contact with said sheet-like member at a heating location in said passage disposed downstream of said venting location.

19. The method according to claim 18 wherein the step of introducing heated gas includes flowing the heated gas against both sides of said sheet-like member.

20. The method according to claim 18 further including the step of delivering cooling gas into direct contact with the sheet-like member at a cooling location in said passage which is downstream of said heating location.

21. The method according to claim 20 wherein said cooling gas is pressurized air, said conveying gas is pressurized air, and said heating gas is pressurized steam.

22. The method according to claim 16 further including the step of:

introducing heated gas into said passage and into direct contact with said sheet-like member at a passage heating location disposed downstream of said conveyor location.

23. The method according to claim 22 wherein the step of introducing heated gas includes flowing the heated gas against both sides of said sheet-like member.

24. The method according to claim 22 further including the step of delivering cooling gas into direct contact with the sheet-like member at a cooling location in said passage which is downstream of said heating location.

25. The method according to claim 13 wherein the predetermined transverse cross-section of said passage is an annulus having radially inner and outer walls.

26. The method according to claim 25 wherein said inner and outer walls are generally circular.

27. The method according to claim 25 wherein said inner and outer walls are polygonal.

28. The method according to claim 13 further comprising the step of pre-crimping at least one of said layers before feeding that layer into said passage.

29. The method according to claim 13 wherein the step of forming comprises the step of extruding a layer of fine fibers of a first material between two layers of a second material perform three layers of said sheet-like member.

30. A method for fabricating a filter for separating constituent components from a fluid, said method comprising the steps of:
forming a plural-layer sheet-like member, having a plurality of layers of material adjacent one another, into an elongated and peripherally continuous tube;
folding said tube to provide multiple sequentially adjacent plural-layer peripheral pleats having fold lines disposed generally transversely of the length of said tube;
the step of forming including the steps of:
feeding said plurality of layers from respective individual locations in adjacent relation into an entrance to a longitudinally-extending, transversely-configured passage of predetermined transverse cross-section; and
conveying the adjacent layers longitudinally through said passage in side by side relation;
the step of folding including the step of withdrawing the sheet-like member from an exit of said passage at an average linear speed which is lower than the linear speed at which said layers are fed to said entrance so as to cause said sheet-like member to be multiply crimped in said passage.

31. The method according to claim 30 wherein the step of folding further includes the step of:
venting said conveying gas from said passage at a passage venting location having a widened transverse cross-section and which is located longitudinally downstream of the conveyor location.

32. The method according to claim 31 further including the steps of:
introducing a heated gas into said passage and into direct contact with said sheet-like member at a heating location in said passage disposed downstream of said venting location; and
delivering cooling gas into direct contact with the sheet-like member at a cooling location in said passage which is downstream of said heating location.

33. A method for fabricating a filter for separating constituent components from a fluid, said method comprising the steps of:
forming a plural-layer sheet-like member, having a plurality of layers of material adjacent one another, into an elongated and peripherally continuous tube;
folding said tube to provide multiple sequentially adjacent plural-layer peripheral pleats having fold lines disposed generally transversely of the length of said tube;
the steps of folding comprising the steps of:
delivering said sheet-like member to an entrance of a longitudinally-extending transversely-confined passage having a predetermined transverse cross-section, said sheet like member being delivered at a first average linear speed;
conveying said sheet-like member longitudinally through said passage; and
withdrawing said sheet-like member from an exit of said passage at a second average linear speed which is lower than said first average linear speed in order to cause the sheet-like member to be multiply crimped in said passage.

34. The method according to claim 33 wherein the step of conveying includes flowing a conveyor gas into said passage at a conveyor location with a flow component directed longitudinally downstream of said passage.

35. The method according to claim 34 wherein the step of folding further includes the step of:
venting said conveying gas from said passage at a passage venting location having a widened transversed cross-section and which is longitudinally downstream of the conveyor location.

36. The method according to claim 35 further including the step of:
introducing a heated gas into said passage and into direct contact with said sheet-like member at a heating location in said passage disposed downstream of said venting location.

37. The method according to claim 36 further including the step of delivering cooling gas into direct contact with the sheet-like member at a cooling location in said passage which is downstream of said heating location.

38. The method according to claim 33 further including the step of:
introducing heated gas into said passage and into direct contact with said sheet-like member at a passage heating location disposed downstream of said conveyor location.

39. The method according to claim 38 further including the step of delivering cooling gas into direct contact with the sheet-like member at a cooling location in said passage which is downstream of said heating location.

40. Apparatus for fabricating a multi-layer filter comprising:
a longitudinally-extending passage of predetermined cross-sectional configuration, said passage having an entrance and an exit;
a delivery means for delivering a sheet-like member having plural layers into said passage via said entrance at a predetermined speed, with said plural layers disposed in successively adjacent relation to one another, said plural layers being disposed transversely of the longitudinal direction of said passage;
a conveyor means for translating said sheet-like member longitudinally through said passage;
a forming means in said passage for forming said sheet-like member into an elongated hollow tube member having an continuous transverse periphery;
said forming means including a pleating means for pleating said sheet-like member while it is conveyed from said passage to form multiple successively adjacent transverse pleats in said sheet-like member, such that each pleat includes said plural layers and a fold line oriented transversely to the longitudinal direction of said passage; and
a means for withdrawing said tube member from said passage at a speed lower than said predetermined speed.

41. The apparatus according to claim 40 wherein said conveyor means comprises means for flowing a conveyor gas through said passage from a conveyor location in a downstream longitudinal direction to carry said sheet-like member through said passage.

42. The apparatus according to claim 41 wherein said pleating means includes a venting location located downstream of said conveyor location and wherein the cross-section of said passage is enlarged, said venting location including a plurality of vent openings for venting said conveyor gas from said passage.

43. The apparatus according to claim 42 further comprising means for introducing a heated gas into said passage at a heating location disposed downstream of said venting location, said means for introducing comprising a plurality of nozzles arranged to issue said heated gas into direct contact with said sheet-like member.

44. The apparatus according to claim 43 further comprising means for introducing a cooling gas into direct contact with said sheet-like member in said passage at a cooling location located downstream of said heating location.

* * * * *